United States Patent [19]

Saglimbeni et al.

[11] Patent Number: 4,896,276

[45] Date of Patent: Jan. 23, 1990

[54] SELF-DIAGNOSIS DEVICE AND PROCESS FOR A MICRO-COMPUTER CONTROL SYSTEM FOR A MOTOR-VEHICLE INTERNAL COMBUSTION ENGINE

[75] Inventors: Renato Saglimbeni, Bollate; Daniele Casagrande, Cesano Boscone, both of Italy

[73] Assignee: Alfo Romeo Auto S.p.A., Naples, Italy

[21] Appl. No.: 853,959

[22] Filed: Apr. 21, 1986

[30] Foreign Application Priority Data

May 14, 1985 [IT] Italy ............................... 20681 A/85

[51] Int. Cl.⁴ ........................ G06F 15/20; G06F 11/00; G01M 15/00

[52] U.S. Cl. ................................ 364/550; 364/551.01; 364/431.11; 364/186; 364/580; 371/16.2; 371/16.4

[58] Field of Search .................... 364/550, 551, 431.01, 364/431.11, 185, 186, 579, 580, 551.01; 123/479, 480, 612; 73/117.3; 371/16, 18, 20, 29

[56] References Cited

U.S. PATENT DOCUMENTS

| | | | |
|---|---|---|---|
| 4,200,224 | 4/1980 | Flint | 371/18 |
| 4,234,921 | 11/1980 | Kinoshita et al. | 364/424 |
| 4,267,569 | 5/1981 | Baumann et al. | 364/431.01 |
| 4,398,258 | 8/1983 | Naitoh et al. | 364/551 |
| 4,623,974 | 11/1986 | Denz et al. | 364/431.01 |
| 4,653,003 | 3/1987 | Kirstein | 371/16 |

*Primary Examiner*—Parshotam S. Lall
*Assistant Examiner*—Ellis B. Ramirez
*Attorney, Agent, or Firm*—Charles E. Brown; Charles A. Brown

[57] ABSTRACT

A self-diagnosis device and process are proposed for a micro-computer control system for an internal combustion engine, particularly studied to display the functional state of preselected components of the same system, when this is in its operating configuration, the test program being executed by the same control system's micro-computer.

7 Claims, 1 Drawing Sheet

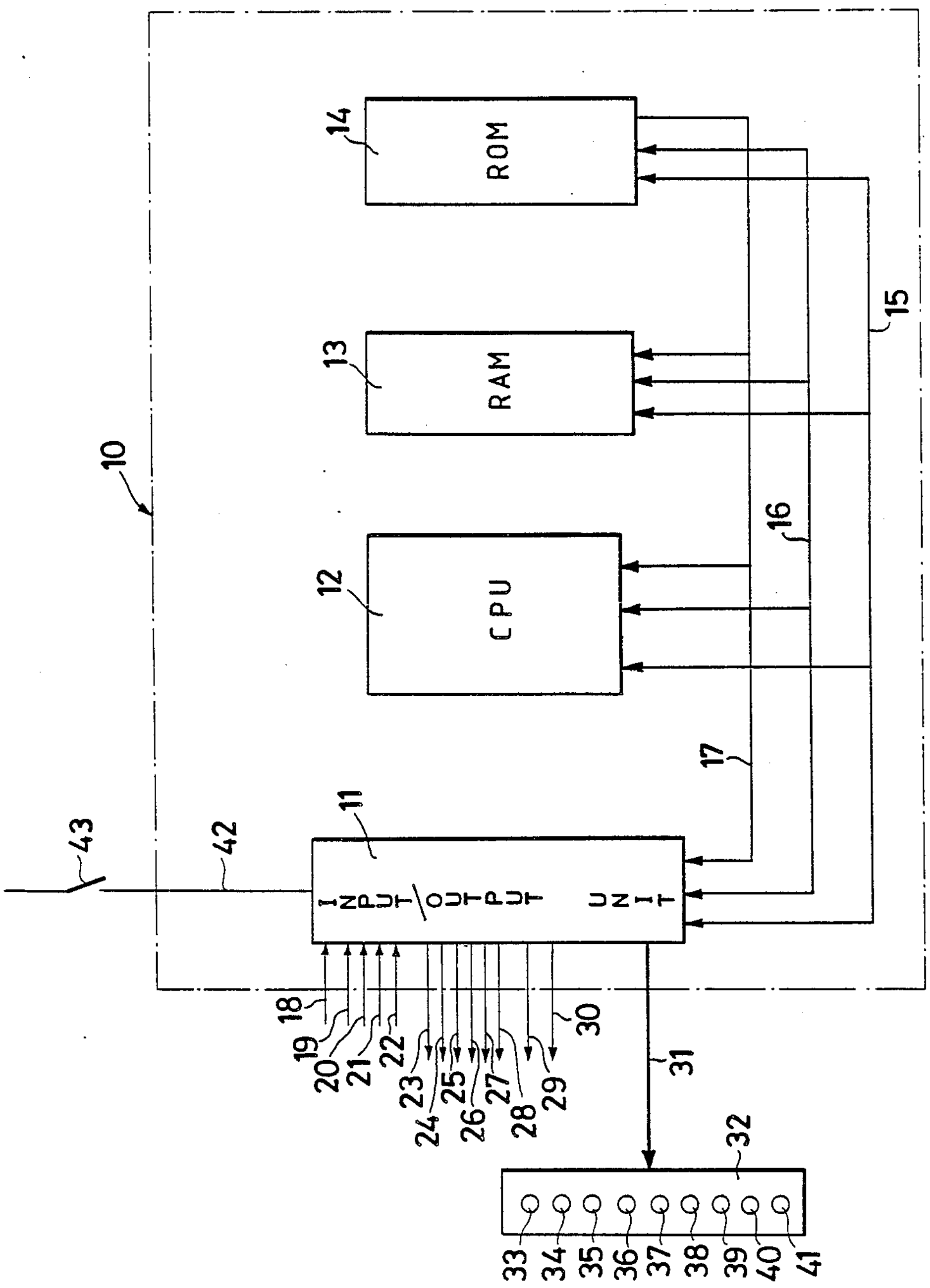
ROM
RAM
CPU
INPUT/OUTPUT UNIT
10
11
12
13
14
15
16
17
18
19
20
21
22
23
24
25
26
27
28
29
30
31
32
33
34
35
36
37
38
39
40
41
42
43

SELF-DIAGNOSIS DEVICE AND PROCESS FOR A MICRO-COMPUTER CONTROL SYSTEM FOR A MOTOR-VEHICLE INTERNAL COMBUSTION ENGINE

The present invention relates to a device and a process of self-diagnosis, to verify the functionality of a control system by programmed micro-computer, particularly used to control preselected operative parameters of an internal combustion (i.c.) engine of a vehicle.

Electronic control systems accomplished with micro-computers are being increasingly used in motor-vehicle industry, above all for the control of operative parameters, such as injection and ignition, of i.c. engines.

These micro-computer systems comprise a central processing unit (CPU), an input unit, an output unit, and memory units formed by permanent memories (ROM) and volatile memories (RAM).

The input unit is generally operative connected to sensors of engine parameters and outlet unit is operatively connected to the actuators of engine's operative parameters, such as injection and ignition.

The CPU processes the data entered by the input unit, according to the computation programs stored in permanent memory, and elaborates the signals to be sent to the output unit for actuators' control.

To avoid errors, and accomplish a satisfactory control of engine's operative parameters, it is necessary that the different system's components operate correctly, remaining within the tolerance prescribed.

Moreover, in case of system's fault or malfunctioning, it is important that the component(s) causing it may be identified quickly and precisely.

It is hence suitable that the functional state of system's different components, and in particular of the critical ones, can be verified, by means of devices prearranged to that purpose, to be used during the system's overhauling and maintenance operations, or also during engine's normal operation, before it is started.

Purpose of the present invention is to provide a self-diagnosis device and process of micro-computer control systems, particularly efficient and reliable, safe and simple to be used. In particular, the device and process of self-diagnosis must be suitable to be integrated in microcomputer control system, when this latter is in its operating configuration.

In view of such a purpose, the present invention provides a self-diagnosis device to verify the functionality of a control system by programmed micro-computer, particularly used for controlling preselected operative parameters of an i.c. engine, wherein said micro-computer is operatively connected to sensors of determined engine parameters and to actuators of determined operative parameters of the same engine, and wherein said self-diagnosis device is provided with means indicating the functional state of said micro-computer, of said sensors and of said actuators, the said device being characterized in that it is provided with connection means operatively connectable to said micro-computer, when this is connected in its turn to said sensors and actuators, said microcomputer being also programmed to execute on command a preestablished sequence of operations of check of the functional state of its components and of said sensors and actuators and to display their state through the said indicator means.

According to a preferred embodiment, the said microcomputer is programmed to verify in a first stage the functional state of its own components, and in further stages, the functional state of preselected sensor and actuator sets, and to correspondingly actuate the said indicator means in subsequent stages.

By means of the device according to the invention, it is hence possible it to verify the functional state of the micro-computer control system, when this is in its operating configuration, in that the test device is operatively connected to said sensors and actuators through the micro-computer, and also in that the test program is executed by the same micro-computer controlling the system's normal operation.

By means of the device, it is moreover possible to test the functional state of individual components, micro-computer, sensors, actuators, to identify with particular reliability the possible cause of system's malfunctioning or fault. This has been accomplished with a limited number of indicator means, because the test program is executed in sequential stages, each of which relates to a determined components' set.

The invention relates also to a self-diagnostic process for testing the functionality of a control system by programmed micro-computer, particularly used to control preselected operative parameters of an i.c. engine, wherein said micro-computer is operatively connected to sensors of determined engine parameters and to actuators of determined operative parameters of the same engine, the said self-diagnostic process allowing displaying on indicator means the functional state of said micro-computer, of said sensors and of said actuators, the said process consisting in operatively connecting said indicator means to said micro-computer, when this is connected in its turn to said sensors and to said actuators, in commanding said micro-computer to execute a pre-established sequence of operations of test of the functional state of its components, of said sensors and actuators, and in displaying the functional state thereof by means of the said indicator means.

Always according to a preferred embodiment, the said process consists in commanding said micro-computer to verify in a first stage the functional state of its own components, and in further stages the functional state of preselected sensor and actuator sets, and in correspondingly actuating also the said indicator means in subsequent steps.

Characteristics and advantages of the invention are illustrated hereunder with reference to the attached drawing, wherein a preferred embodiment of the same invention is represented to exemplifying and not limitative purposes, and in schematic way.

In the single figure, with 10 the microcomputer is generally indicated of an ignition and fuel injection control system of a six-cylinder i.c. engine (not shown).

The microcomputer comprises and input/output unit 11, a microprocessor (CPU) 12, a reading and writing memory (RAM) 13, a permanent, of reading only, memory (ROM) 14.

The components of the micro-computer are connected with one another by means of parallel interconnecting lines (bus) 15, 16, 17, respectively for data, for addresses and for the inner control signals.

Into input/output unit 11 there are lines 18, 19, 20, 21, 22 connected to respective sensors of engine parameters, i.e., temperature of air intaken by the engine, temperature of cooling water of same engine, engine's stroke and revolutions per minute (rpm), feeding air shutter throttle valve(s) angle.

In the permanent memory 14, the data processing programs are stored, to be executed by microprocessor 12 to control engine's injection and ignition. In the same memory, the self-diagnostic program for the testing of the system's functionality is contained, and the data necessary for executing the operations started in the same programs are stored.

From unit 11 the lines 23, 24, 25, 26, 27, 28 originate, which lead the actuation signals to the power stages of electroinjectors, not shown, supplying fuel to engine's six cylinders.

From unit 11 moreover lines 29 and 30 originate, leading the one the signals for the control in conduction of ignition coil(s) (not shown), and the other the signals for the bidirectional control of shutter throttle valve(s) stopper actuator.

Through a connection line 31, the unit 11 can be connected to an indicator device 32 provided with nine warning lights 33, 34, 35, 36, 37, 38, 39, 40, 41, provided to respectively signal the functionality of air temperature sensor, connected to line 18, of water temperature sensor, connected to line 19, of engine stroke sensor, connected to line 20, of engine rpm sensor, connected to line 21, of throttle valve(s) angle sensor, connected to line 22, of ignition coil, connected to line 29, of throttle valve(s) stopper actuator, connected to line 30, and of electroinjectors, connected to lines 23 to 28.

The warning light 41 is provided to verify the current supply, as supplied to the system by the battery (not shown) via a line 42 and a key-switch 43.

The operations of self-diagnostic program are executer by microprocessor 12 when the device 32 is connected to unit 11, and the key-switch 43 is turned on.

Under these conditions, the microprocessor is commanded to interrupt the main program, relating to the injection and ignition control, to switch to the and execution of self-diagnostic program.

After having verified that the system is correctly energized, and hence that warning light 41 is turned on, the microprocessor verifies the functionality of its memories 13 and 14.

During the test, warning lights 33 to 40 of device 32 are commanded to flash, and the operator can visually verify their functional state. If the test gives a positive result, the microprocessor keeps turned on the warning lights, and passes ahead to execute the operations of the program of testing of sensors and actuators connected to unit 11.

The microprocessor tests the functionality of air tem temperature sensors (line 18), and water temperature sensors (line 19), verifying that the temperature value detected by the sensors is comprised between a pre-established minimum value, and a pre-established maximum value close respectively to the lower and upper limits of sensors' measurement ranges.

If test result is positive, related warning lights 33 and 34 are switched off.

The microprocessor tests the electrical continuity of ignition coil's circuit, verifying that the load current reaches a pre-established maximum value, and in case of correct operation, switches on the related warning light 38, after having also controlled the coil's discharge, to prevent that the spark may be ignited at spark plugs. The microprocessor verifies the electrical continuity of electroinjectors' circuit, verifying that during pre-established time intervals the discharge current reaches preselected threshold values.

Preferably, threshold values lower than the values adopted for normal operation are preselected, to avoid the electroinjectors to be opened to uncontrollable fuel supplies.

If test result is positive, related warning light 40 is switched off. If on the contrary the same warning light remains turned on, the microprocessor is able to indicate which injector(s) is (are) malfunctioning, by means of warning lights 33–38, after having completed the test of functionality of all sensors and actuators under test.

In order that the microprocessor may test the functionality of throttle valve(s) angle sensor, it is necessary that the driver commands the opening thereof; as soon as the microprocessor detects an angular variation in the signal emitted by the sensor, it verifies that the same angular signal has the stated values.

It results from that, that if sensor is correctly operating, also the warning light 37 is switched off.

The microprocessor passes then to test the throttle valve stopper actuator, sending the command signals corresponding to minimum and maximum stroke.

Also in this case, the warning light 39 is switched off if the test result is positive.

For it to be possible to the microprocessor to test the engine stroke and rpm sensors, it is necessary that the driving shaft be made turn, by at least two revolutions, by actuating the starter.

The microprocessor verifies then that through the line 20 the impulses are present which supply the stroke indication, and that through the line 21 the impulses are present which allow determining engine's turning rate.

If the test results are positive, also warning lights 35 and 36 are switched off.

If, after the stage of said sensor and actuator testing, the microprocessor detectes that the warning light 40, relating to the electroinjectors, has remained turned on, it signals which one(s) of same injectors is(are) malfunctioning, by turning on again one or more ones of the first six warning lights 33 to 38.

We claim:

1. Self-diagnosis device for verifying the functionality of a control system with programmed micro-computer for controlling preselected operative parameters of an i.c. engine, said micro-computer being operatively connected to sensors of determined engine parameters and to actuators of determined operative parameters of the same engine, said self-diagnosis device comprising indicator means for indicating the functional state of said micro-computer, of said sensors and of said actuators, connection means operatively connectable to said micro-computer and in turn connected to said sensors and actuators, said micro-computer being also programmed to execute on command a preestablished sequence of operations to check the functional state of components of said micro-computer and of said sensors and actuators and to display their state through said indicator means, said microcomputer being further programmed to execute on command a preestablished sequence of operations to check the functional state of said sensors and said actuators by using operation simulating signals.

2. Self-diagnosis device according to claim 1, wherein said micro-computer is programmed to verify in a first stage the functional state of its own components, and in further stages, the functional state of preselected sensor and actuator sets by using said operation simulating signals and to correspondingly actuate said indicator means in subsequent stages.

3. Self-diagnosis device according to claim 1, wherein said connection means is operatively connected to at least one electro-injector provided to supply fuel to said engine, and said micro-computer is further programmed to verify whether in pre-established time intervals a charge current fed to said at least one electro-injector reaches pre-selected threshold values preferably lower than operating values, and to display the test result through said indicator means.

4. Self-diagnosis device according to claim 3, wherein said connection means is operatively connected to at least two electro-injectors each provided to supply fuel to said engine, and said micro-computer is further programmed to check and to display through said indicator means which of said electro-injèctors under operational conditions will not correctly operate.

5. Process for the self-diagnosis of the functionality of an internal combustion engine control system which includes a programmed micro-computer connected to sensors of determined engine parameters and to actuators of determined operative parameters of the engine with the functional state of the micro-computer, the sensors and the actuators being displayed on indicator means, said process comprising the steps of:

executing by the micro-computer a pre-established sequence of operations of checking the operational functional state of components of the micro-computer;

displaying the functional state of the micro-computer components on the indicator means;

executing by the micro-computer a pre-established sequence of operations of checking the operational functional state of each sensor by using operation simulating signals and displaying the functional state of each sensor on the indicator means; and executing by the micro-computer a pre-established sequence of operations of checking the operational functional state of each actuator by using operation simulating signals and displaying the functional state of each actuator on the indicator means.

6. Process according to claim 5, wherein said process includes the step of the micro-computer executing a test to check whether in a pre-established time interval a load current of at least one electro-injector which supplies fuel to the engine reaches a pre-selected threshold value and preferably a lower value than those under normal operating conditions, and wherein the results of the test are displayed on the indicator means.

7. Process according to claim 6, wherein the engine has at least two electro-injectors and each electro-injector is tested for load current values by the micro-computer and the test results of each electro-injector being displayed on the indicator means.

* * * * *